(12) United States Patent
Liu et al.

(10) Patent No.: US 8,973,065 B2
(45) Date of Patent: Mar. 3, 2015

(54) IPTV OFF-PATH ADMISSION CONTROL SIGNALING IN THE PRESENCE OF NETWORK ADDRESS TRANSLATION

(75) Inventors: Xiaomei Liu, San Jose, CA (US); John Pickens, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 1104 days.

(21) Appl. No.: 12/504,982

(22) Filed: Jul. 17, 2009

(65) Prior Publication Data

US 2011/0016499 A1  Jan. 20, 2011

(51) Int. Cl.
| H04N 7/173 | (2011.01) |
| --- | --- |
| H04N 21/239 | (2011.01) |
| H04L 12/927 | (2013.01) |
| H04N 21/61 | (2011.01) |
| H04L 29/06 | (2006.01) |
| H04L 29/12 | (2006.01) |

(52) U.S. Cl.
CPC .......... *H04N 21/2396* (2013.01); *H04L 47/801* (2013.01); *H04N 21/6118* (2013.01); *H04L 65/4084* (2013.01); *H04L 65/80* (2013.01); H04L 29/12528 (2013.01); H04L 29/12566 (2013.01); H04L 61/2575 (2013.01); H04L 61/2589 (2013.01)
USPC .............................................. 725/86; 725/93

(58) Field of Classification Search
None
See application file for complete search history.

(56) References Cited

U.S. PATENT DOCUMENTS

| 6,223,222 | B1* | 4/2001 | Fijolek et al. ................. 709/227 |
| --- | --- | --- | --- |
| 7,634,595 | B1* | 12/2009 | Brown et al. ................... 710/38 |
| 7,650,361 | B1* | 1/2010 | Wong et al. ............ 707/999.107 |
| 2005/0105533 | A1* | 5/2005 | Malolepsy et al. ...... 370/395.41 |
| 2005/0183120 | A1* | 8/2005 | Jain et al. ........................ 725/46 |
| 2006/0095472 | A1* | 5/2006 | Krikorian et al. .......... 707/104.1 |
| 2006/0168612 | A1* | 7/2006 | Chapman et al. ............... 725/11 |

OTHER PUBLICATIONS

Rosenberg, J.; "*Interactive Connectivity Establishment (ICE): A Protocol for Network Address Translator (NAT) Traversal for Offer/Answer Protocols (draft-ietf-mmusic-ice-19)*"; Cisco; Oct. 29, 2007; 120 Pgs.
Schulzrinne, H.; "Real Time Streaming Protocol (RTSP)"; The Internet Society; Apr. 1998; 94 Pgs.
Rosenberg, J.; "Session Traversal Utilities for NAT (STUN)"; Cisco; Oct. 2008; 53 Pgs.
Rosenberg, J.; *STUN—Simple Traversal of User DatagramProtocol (UDP) Through Network Address Translators (NATs)*; dynamicsoft; Mar. 2003; 49 Pgs.

* cited by examiner

*Primary Examiner* — Mark D Featherstone
(74) *Attorney, Agent, or Firm* — Merchant & Gould (57) ABSTRACT

Off-path admission control signaling in the presence of a network address translation (NAT) device may be provided. In response to a request for a content asset, a placeholder classifier may be created. The placeholder classifier may be used to allocate resources for providing the content asset to the client from a content server. The content server may communicate with the client, traversing the NAT device to identify a destination address and port for the client to which the content will be provided. The placeholder classifier may then be updated with the destination address and port.

20 Claims, 5 Drawing Sheets

IPTV OFF-PATH ADMISSION CONTROL SIGNALING IN THE PRESENCE OF NETWORK ADDRESS TRANSLATION

FIELD OF THE INVENTION

This invention relates in general to the field of cable television provision over a network, and more particularly to methods for providing services to subscribers utilizing a home network.

BACKGROUND

Off-path admission control signaling is a method for providing signaling flow in an IP Television (IPTV) network via a different path from the video data path. In some situations, cable television subscribers may wish to order a network provided asset, such as a video on demand (VoD) program. The VoD program may be requested and/or provided over a subscriber's home network, but for many home networks, only a single public IP address may be exposed, such as by a firewall or gateway router providing a network address translation (NAT) service. This can cause problems in an Integrated Service (IntServ) system which implements the Quality of Service (QoS) on a per flow basis, where the flow is identified with classifiers such as source address, destination address and port numbers. In such as a system, the IPTV network may need to know the details of an associated control classifier in order to reserve sufficient bandwidth to the destination address and port, but the destination address and port may not be known until the classifier is set up and the bandwidth is known to be available.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Off-path admission control signaling in the presence of a network address translation (NAT) device may be provided. In response to a request for a content asset, a placeholder classifier may be created. The placeholder classifier may be used to allocate resources for providing the content asset to the client from a content server. The content may traverse the NAT device to identify a destination address and port for the client to which the content will be provided. The placeholder classifier may then be updated with the destination address and port after the information is available.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Off-path admission control signaling in the presence of network address translation (NAT) may be provided. Consistent with embodiments of the present invention, a home may have multiple cable boxes, or set-top terminals (STTs), connected via a network. The STTs may communicate with a cable television network via an IP network through a gateway and/or firewall, allowing the home to receive programming and request content, such as Pay-Per-View (PPV) and/or Video on Demand (VoD) programs. Requests for such content may be authenticated by a session resource manager that may select a VoD server to provide the requested program. The program may then be transmitted through a cable modem termination system (CMTS) to the home for viewing.

NAT may comprise a process of modifying network address information in datagram packet headers while in transit across a traffic routing device for the purpose of remapping a given address space into another. Multiple private network addresses may be hidden behind a single IP address in another, often public address space, such as an address space used by a network like the Internet.

NAT may be implemented in a routing device that uses stateful translation tables to map the hidden addresses into a single address and then rewrites outgoing Internet Protocol (IP) packets on exit so that they appear to originate from the router. In the reverse communications path, responses are mapped back to the originating IP address using the rules ("state") stored in the translation tables, such as tracking communications via arbitrarily assigned port numbers. For example, the NAT device may assign a port for incoming transmissions such that the transmission may be routed to the appropriate destination. The destinations may comprise one of several networked devices at a location, each with a uniquely assigned private IP address (for example, according to published IETF standards RFC 1918 and RFC 4193).

Figure 1:
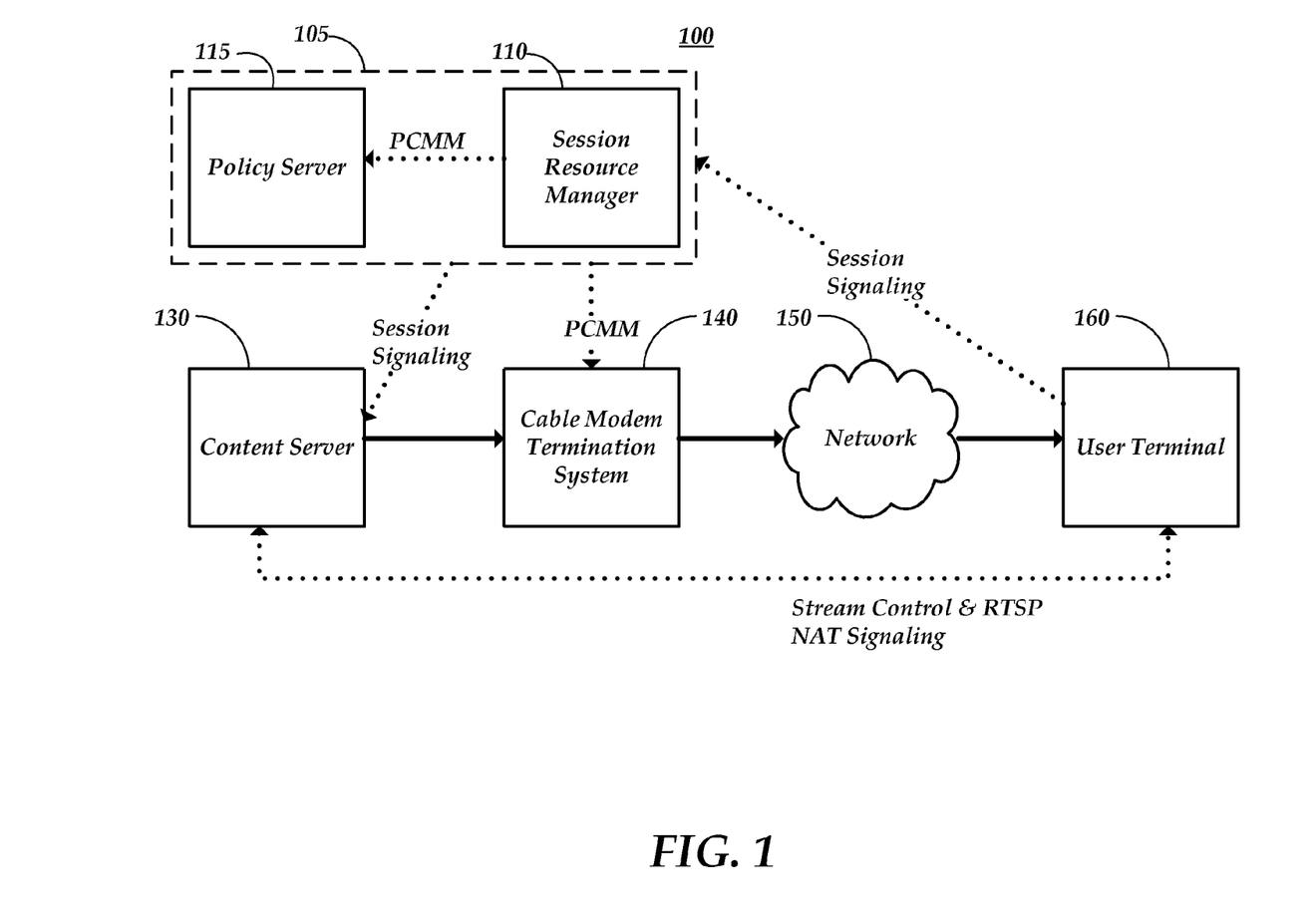
FIG. 1 is a block diagram of a cable television network.

FIG. 1 is a block diagram view of a cable television system (CTS) 100 comprising an integrated network system that features video, audio, voice and data services to subscribers or STT users. Although FIG. 1 depicts a high level view of CTS 100, it should be appreciated that a plurality of cable television systems can tie together a plurality of regional networks into an integrated global network so that STT users may receive content or services from anywhere in the world. CTS 100 may comprise an admission control system 105 comprising a session resource manager (SRM) 110 and a policy server 115. CTS 100 may further comprise a control interface connected to a content server 130, a cable modem termination system (CMTS) 140, a user terminal 160 such as a set-top terminal (STT), and a cable modem 170. User terminal 160 and cable modem 170 may be co-located at a subscriber location 180, such as a subscriber's home. Components of CTS 100 may be connected via a network 150. Any and/or all of admission control system 105, content server 130, and CMTS 140 may be located in a headend or a hub site.

CTS 100 may deliver broadcast video signals as digitally formatted signals in addition to delivering traditional broadcast analog video signals. Furthermore, CTS 100 may support one-way broadcast services as well as both one-way data services and two-way media and data services. The two-way operation of the network may allow for user interactivity with services, such as Pay-Per-View programming, Near Video-On-Demand (NVOD) programming, Video-on-Demand (VOD) programming, and interactive applications, such as Internet connections and interactive services that render real-time bi-directional communication on a personalized basis such as bi-directional audio-visual communication. CTS 100 may also provide interfaces, network control, transport control, session control, and servers to access content and services, and distributes content and services to STT users. CTS 100 may also provide the interfaces, network control, transport control, session control, and servers to establish on-demand session-based bi-directional communication service between a particular remote destination and a STT user for delivering media from the particular remote destination to the STT user and input information from the STT user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated CTS 100 resources may be allocated to fulfill individualized bi-directional communication over a purchasable period.

As shown in FIG. 1, CTS 100 may comprises a cable hub comprising CMTS 140 and a connection to network 150, such as a hybrid fiber-coax (HFC) network that may connect the cable hub to user terminal 160 (the terms "user" and "subscriber" may be used interchangeably). It should be appreciated that although a single component (e.g., a STT) is illustrated in FIG. 1, CTS 100 may feature a plurality of any one of the illustrated components or may be configured with alternative embodiments for any one of the individual components or with yet other additional components not enumerated above. Content server 130 may comprise, for example, a Video on Demand server that may transmit information pertaining to purchasable bi-directional communication services to the cable hub for further downstream transmission to subscribers in the network.

A bi-directional communication type of service, purchasable as an individualized service by a STT user, may be provided by the content provider via communication with an external communication interface in the headend. Content provided by a content provider may be retrieved and communicated by a cable operator or communicated by the content provider to CMTS 140. From CMTS 140 the content nay be communicated over network 150 that may include a plurality of HFC access networks. Network 150 may comprises a plurality of HFC nodes, each of which may serve a local geographical area. An HFC node may be connected to a network interface unit (NIU) such as cable modem 170. The NIU may be located at a user's property and may provide a transparent interface between the HFC node and user terminal 160. Coaxial cables may be used to couple nodes and NIUs because the electrical signals can be easily repeated with radio frequency (RF) amplifiers.

Figure 2:
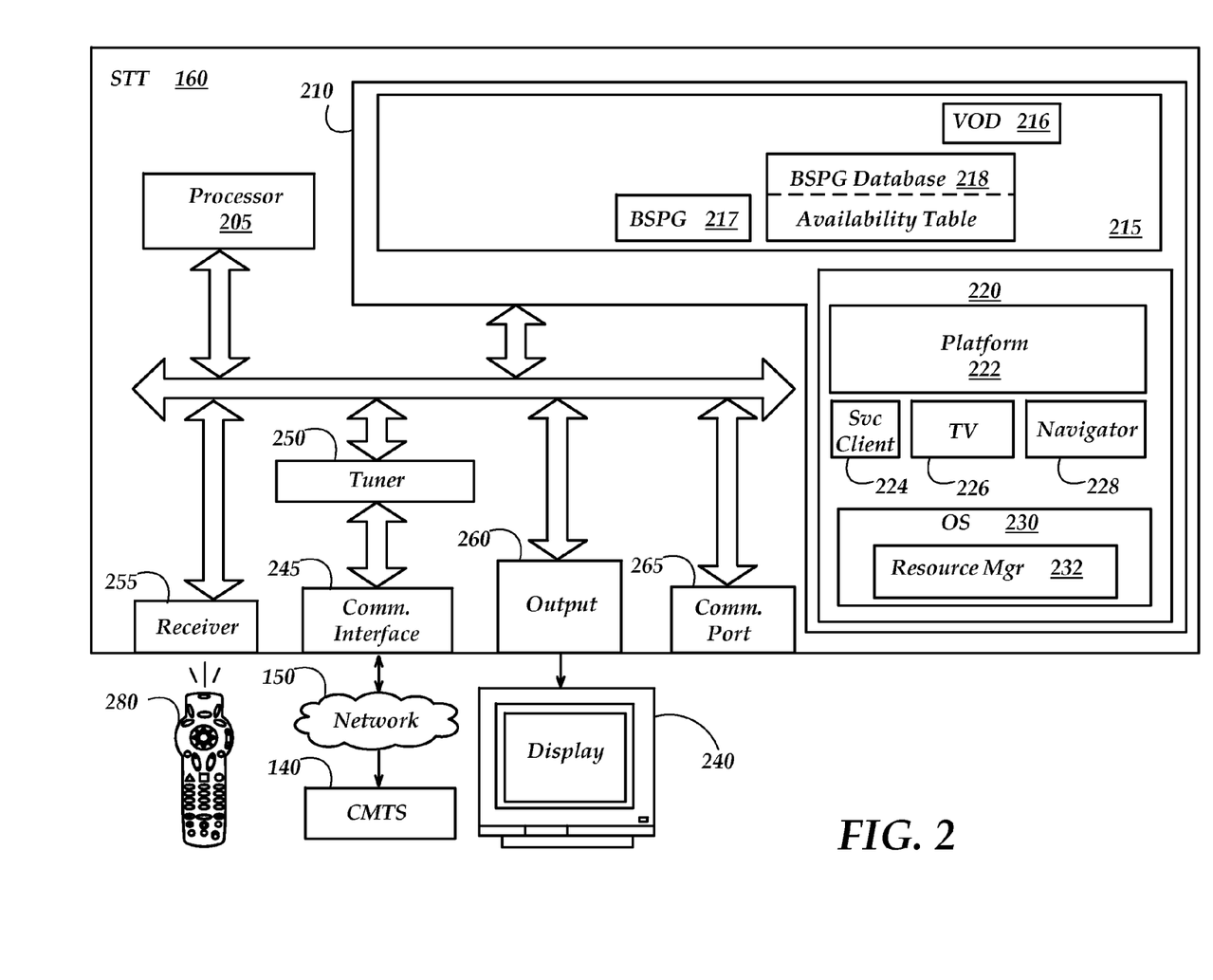
FIG. 2 is a block diagram illustrating components of a user terminal.

FIG. 2 is a block diagram illustrating components of user terminal 160. User terminal 160 may by situated within the residence or business of a subscriber. It may be integrated into a device that has a display, such as a computing device, or it may be a stand-alone unit that couples to an external display, such as a display 240 included with a computer or a television. User terminal 160 may process media transported in television signals for presentation or playback to a subscriber. User terminal 160 may comprise a communications interface 245 for receiving the IP cable signals, which may include media such as video, audio, graphical and data information, from cable modem 170 and for providing any reverse information (such as admission control data as required by a subscriber that has purchased a bi-directional service) to the headend. User terminal 160 may further comprise a processor 205 for controlling operations of user terminal 160, including a video output port such as an RF output system 260 for driving the display 240, a tuner system 250 for tuning into a particular television channel to be displayed and for sending and receiving data corresponding to various types of media from the headend.

Additionally, user terminal 160 may include a receiver 255 for receiving externally generated information, such as user inputs or commands for other devices. User terminal 160 may also include one or more wireless or wired communication interfaces, such as a communication port 265, for receiving and/or transmitting data to other devices. For instance, user terminal 160 may feature USB (Universal Serial Bus) (for connection to a USB camera or microphone), Ethernet (for connection to a computer), IEEE-1394 (for connection to media devices in an entertainment center), serial, and/or parallel ports. A computer or transmitter may for example, provide the user inputs with buttons or keys located either on the exterior of the terminal or by a hand-held remote control device 280 or keyboard that includes user-actuated buttons. In the case of bi-directional services, a user input device may include audiovisual information such as a camera, microphone, or videophone. As a non-limiting example, user terminal 160 may feature USB or IEEE-1394 for connection of an infrared wireless remote control or a wired or wireless keyboard, a camcorder with an integrated microphone or to a video camera and a separate microphone.

User terminal 160 may simultaneously decompress and reconstruct video, audio, graphics and textual data that may, for example, correspond to a live program service. This may permit user terminal 160 to store video and audio in memory in real-time, to scale down the spatial resolution of the video pictures, as necessary, and to composite and display a graphical user interface (GUI) presentation of the video with respective graphical and textual data while simultaneously playing the audio that corresponds to the video. The same process applies in reverse and STT 160 can, for example, digitize and compress pictures from a camera for upstream transmission.

A memory 210 of user terminal 160 may comprise a dynamic random access memory (DRAM) 215 and a flash memory 220 for storing executable programs and related data components of various applications and modules for execution by user terminal 160. Both flash memory 220 and DRAM memory 215 may be coupled to processor 205 for storing configuration data and operational parameters, such as commands that are recognized by processor 205.

Basic functionality of user terminal 160 may be provided by an operating system 230 contained in flash memory 220. One or more programmed software applications, herein referred to as applications, may be executed by utilizing the computing resources in user terminal 160. Applications stored in flash memory 220 or DRAM memory 215 may be executed by processor 205 (e.g., a central processing unit or digital signal processor) under the auspices of operating system 230. Data required as input by the application program may be stored in DRAM memory 215 and read by processor 205 from DRAM memory 215 as needed during the course of application program execution. Input data may be data stored in DRAM memory 215 by a secondary application or other source, either internal or external to user terminal 160, or possibly anticipated by the application and thus created with the application program at the time it was generated as a software application program, in which case it may be stored in flash memory 220. Data may be received via any of the communication ports of user terminal 160, from the headend via communication interface 245 or as user input via receiver 255. A type of input data fulfills and serves the purpose of parameters as described below. Data generated by application program is stored in DRAM memory 215 by the processor 205 during the course of application program execution.

Flash memory 220 may also comprise a platform library 222. Platform library 222 may comprise a collection of functionality useful to applications, such as a timer manager, compression manager (for compressing text, video and/or audio), database manager, string managers, and other utilities (not shown). These utilities may be accessed by applications as necessary so that each application does not have to contain these utilities thus resulting in memory consumption savings and a consistent user interface.

A service client 224 may provide a model in which the user may access services available on CTS 100. A service may comprise an application to run and a parameter, such as data content, specific to that service. Service client 224 may handle the lifecycle of the applications on the system, including the definition, initiation, activation, suspension and deletion of services they provide and the downloading of the application into user terminal 160 as necessary. Many services can be defined using the same application component, with different parameters. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID. Service client 224 may also interface with a resource manager 232 to control resources of user terminal 160.

An application client is the portion of an application that executes on user terminal 160 and provides the application's services to the user typically through a graphical user interface. Also contained in flash memory 220 is a navigator application 228 that may provide a navigation framework for the user to access services available on the cable system. Examples of the services include, in one implementation, watching television and pay-per-view events, listening to digital music, and an interactive bi-directional service program guide, each of which is controlled through separate applications in flash memory 220. Navigator 228 may allow users to access various settings of user terminal 160, including volume, parental control and VCR commands. Moreover, navigator 228 may provide users with television related menu options that correspond to STT functions such as interactive program guides, channel blocking and/or displaying a content purchase list.

A traditional interactive program guide (IPG), TV 226, and pay-per-view (PPV) are examples of resident applications in flash memory 220. The IPG displays a program guide to the user and populates the guide with program data for selection. TV 226 may enable a user to simply "watch television" while PPV enables viewing of premium television services. These applications, because they are in flash memory 220, may always be available to the user and do not need to be downloaded each time user terminal 160 initializes.

The applications that are stored in DRAM 215 may be applications that are loaded when user terminal 160 initializes or are applications that are downloaded to user terminal 160 upon a user-initiated command using an input device such as remote 280. In a non-limiting example, DRAM memory 215 may contain the following application clients (hereinafter referred to as "application(s)"): a video-on-demand application (VOD) 216, an e-mail application and a digital music application. Additionally, DRAM memory 215 may comprise a calendar and/or a calculator application.

The applications discussed above and other applications provided by a cable system operator may comprise top level software entities on the network for providing services to the user. In one implementation, all applications executing on user terminal 160 may work with navigator 228 by abiding by several guidelines. For example, an application should first utilize and implement service client 224 for provisioning, activation, and suspension of services. Second, an application should share STT resources with other applications and abide by the resource management policies of service client 224, operating system 230, and user terminal 160. Third, an application should handle all situations where resources are unavailable without navigator 228 intervention. Fourth, when an application loses service authorization while providing a service, an application should suspend the service gracefully. The navigator 228 will reactivate an individual service application when it later becomes authorized. Finally, an application should be configured so it does not respond to input commands reserved for the navigator. For instance, as a non-limiting example, when user input commands are entered via remote control device 280 or a keyboard, the application should be configured so it does not have access to certain user input keys that are reserved by the navigator 228 (e.g., power, channel +/−, volume +/−, etc.). Without limitation to the foregoing, in some circumstances certain applications during the course of program execution may reach a machine-state in which input keys that would ordinarily be reserved may be employed for input by the application but only during that particular machine-state. For example, an application may display a user interface that specifically requests input or selection from the user in which one or more of the reserved keys are used momentarily during that machine-state.

DRAM memory 215 may further comprise a bi-directional services program guide (BSPG) client 217. BSPG client may be downloaded into DRAM 215 from the headend. Consistent with embodiments of the invention, BSPG client 217 may be resident in flash memory 220. BSPG client 217 may employs a BSPG database 218 of records that comprises of information pertaining to bi-directional communication services for presentation to a subscriber.

A bi-directional communication service may be rendered as a session-based service effected by the headend components as described above. Among other things, session-based bi-directional communication services may include services that are purchasable by a subscriber on an individualized basis for a period of time. A purchasable bi-directional communication service may comprise a vendor that communicates remotely with the purchaser over the period of time for which the service is purchased. Particular vendors may offer the flexibility to purchase their respective services for any from a plurality of time durations, reflecting higher pricing for longer periods. Other purchasable bi-directional communication services, such as a person-to-person bi-directional audiovisual phone session, may not involve a vendor at the remote location.

A session for a bi-directional communication service may comprise communication concurrently between a vendor and a plurality of subscribers and a session for a bi-directional communication service may comprise real-time communication between a subscriber and a vendor or friend. Alternatively, a subscriber can purchase a bi-directional communication service for a future period resulting in a purchased reservation for the respective service. Hence, a bi-directional communication service may be fulfilled as a scheduled session per an advanced purchase by a subscriber.

BSPG database 218 may comprise sufficient information for the presentation of available bi-directional communication services at the current time and for subsequent periods. A BSPG application server (located, for example, at the headend and/or a content provider site) in communication with BSPG client 217 may effect updates to BSPG database 218 stored in memory 215 or in a storage device connected internally or externally to user terminal 160 via a data communication port such as a USB (Universal Serial Bus) or IEEE-1394.

BSPG client 217 may comprise a GUI that may be customized remotely by the system operator and updated as program data is received by user terminal 160 via its cable communication interface. BPSG client 217 may receive input commands generated by a user via an input device such as remote control device 280 or via communication port 265. BSPG client 217 may read records in BSPG database 218 and process them into a displayable representation as part of a GUI presentation displayed on display 240 or similar display device for presentation to a subscriber.

BSPG information associated with a bi-directional communication services may be transmitted on a regular or periodic basis from the BSPG application server to one or more STTs. BSPG information may comprise descriptive information to populate the entries of a BSPG presentation, a service guide, or a presentation with the corresponding BSPG fields that are presented to the subscriber via a Graphical-User-Interface (GUI) from which a subscriber can select and request additional descriptive information about respective bi-directional communication services. Hence, per service information in the displayed presentation to the subscriber, the subscriber may retrieve and view (and hear if applicable) information specific to a service and proceed to select and purchase a specific service for a price over a period of time. BSPG information comprises data organized into database records with fields containing, but not limited to, information such as a service title, service content description, service category, name of vendor providing service, one or more names of individuals representing vendor that are available to fulfill the service, and service's rating information. BSPG database 218 may comprise additional data, including a plurality of purchasable durations with price for each respective service; an indication of whether a service can be optionally recorded by the purchaser for an additional price; one or more time intervals for which a service is available during the day; days of the week for which a service can be purchased; and a calendar window comprising a start date and an end date for which a service is offered. A service may be offered indefinitely.

Options for purchasing a package for multiple sessions of a service can be included in the BSPG database. BSPG database records may also include information such as service active times, service titles, service descriptions, service genres, casts lists, ratings information, price criteria (or combinations of multiple price criteria) associated with various viewing options, service durations, and/or links to additional respective program related information such as service previews. The effective window of days and times in which a service is available for purchase may also be included. Further, geographical information related to purchasable services may be included in the database records, such as time zone, geographical location and language(s) of merchant. Other illustrative information that may be present includes type of service (e.g. audio or video or both) and video quality/resolution.

BSPG database 218 may include additional information associated with each respective service's availability at the current time. BSPG database 218 may include a separate availability table of entries, each entry associated with a respective service, each service having an index number for which the table can be rapidly be indexed with a service's number, and each entry respectively indicating whether a service is available at a selected time. Whereas the BSPG information associated with a bi-directional communication services may be transmitted on a regular or periodic basis from the BSPG application server to one or more STTs, the "availability table" or one or more subsets thereof, may be transmitted asynchronously and on a more frequent basis as need be to update the availability status of services at the current time.

A bi-directional communication service may comprise real-time communication concurrently between a vendor and a plurality of subscribers. The headend may be configured to provide purchasable bi-directional communication services, either as an on-demand or a scheduled reservation service with a plurality of possible delivery durations. In the system headend, an application server and a plurality of other application servers may be connected to a digital network control system (DNCS). The application server may be responsible for reserving and configuring system resources (e.g. bandwidth) needed to provide bi-directional communication services, for packaging, configuring and making available to the system various software applications and data 218 corresponding to the available bi-directional communication services.

A BSPG client 217 executing on processor 205 in STT 16 may generate a user interface that may be displayed on television 441 for the subscriber to browse, purchase, and establish individualized bi-directional communication with any from a plurality of bi-directional communication services. This may require, among other things, engaging, preferably, in a direct two-way IP (Internet Protocol) connection with bi-directional communication (BC) servers for a finite period.

Admission control may comprise an important design aspect in guaranteeing video delivery quality, particularly in an IPTV network, and may comprise authenticating and processing user requests for premium content. Two paradigms in admission control comprise on-path and off-path admission control. In on-path admission control, a resource reservation protocol (RSVP) may be triggered by content server 130 and may communicate with CMTS 140 using the same data path as the content data, such as a requested VoD stream. Admission control may be performed by components along the data path, such as network routers and CMTS 140. In off-path admission control, SRM 110 may receive a request for content from user terminal 160. SRM 110 may then requests resources, such as bandwidth from the data path components, such as CMTS 140 in an IPTV over DOCSIS (Data Over Cable Service Interface Specification, a standard published by the non-profit research consortium CableLabs®) system.

Figure 3:
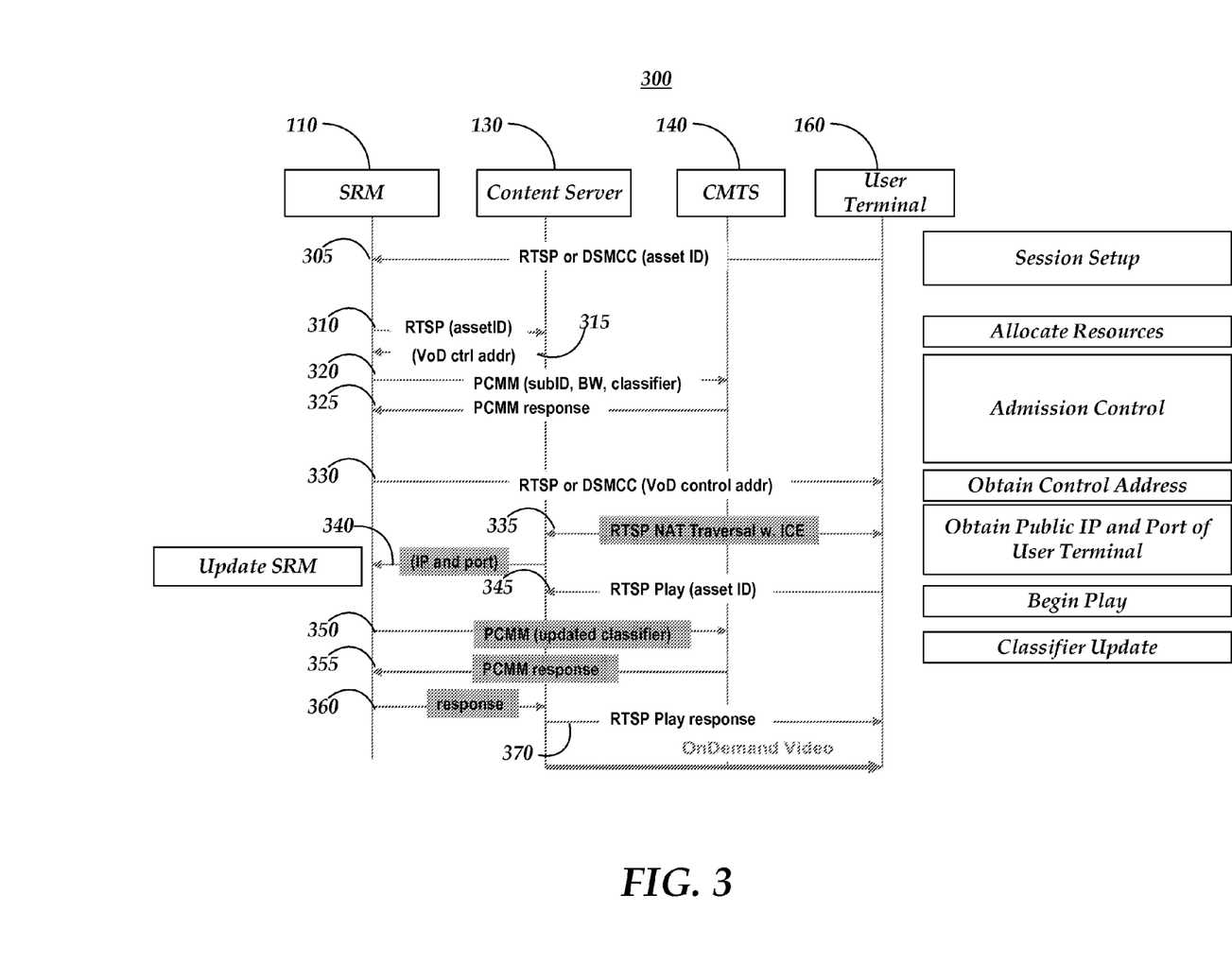
FIG. 3 is a timing diagram illustrating a method for initial admission control signaling.

FIG. 3 is a timing diagram 300 illustrating a method for initial off-path admission control signaling. At stage 305, user terminal 160 may select a VoD asset, such as through navigator 228. User terminal 160 may signal SRM 110 with an asset ID, as stored in BSPG database 218, and a public IP and port address for user terminal 160. At stage 310, SRM 110 may signal content server 130 to request a streaming server resource. For example, content server 130 may comprise a VoD server providing streaming audiovisual assets. Content server 130 may respond, at stage 315, with a control address and port from which the asset may be provided.

SRM 110 may then signal CMTS 140, at stage 320, to request DOCSIS bandwidth with a packet cable multimedia (PCMM) interface. SRM 110 may create a data object called a classifier to identify the flow of the asset delivery. SRM 110 may pass the packet classifier (comprising a source IP, a source port, a destination IP, a destination port, a protocol, and other control information) to CMTS 140. A public IP address of user terminal 160, such as that used by cable modem 170, may be correctly identified according to the asset request.

At stage 325, CMTS 140 may respond to SRM 110 confirming that the resources for providing the requested asset have been reserved and/or informing SRM 110 that the needed resources are not available. At stage 330, SRM 110 may return VoD server information, such as the VoD server control IP address and port, to user terminal 160. In some situations, user terminal 160 may communicate directly with the selected VoD server and starts playing the VoD asset, at stage 345.

A network address translation (NAT) device providing connectivity to user terminal 160 may pose problems for this process. For example, when the NAT device implements address and port dependent mapping, the public IP address and port of user terminal 160 may be different when user terminal 160 communicates with SRM 110 and content server 130 respectively. This may cause the classifier passed by SRM 110 to CMTS 140 mismatch the video stream from content server 130 to user terminal 160.

In a NAT environment, content server 130 may communicate with the NAT device and user terminal 160 at stage 335 using, for example, the IETF standard real-time streaming protocol (RTSP) published as RFC 2326, session traversal utilities for NAT (STUN) published as RFCs 3489 and 5389, and the interactive connectivity establishment (ICE) mechanism published as draft IETF-mmusic-ice, rev. 19. After this communication, the VoD server 130 may discover the right destination IP and port to stream the VoD asset.

Consistent with embodiments of the invention, the PCMM specification may be used to support multiple traffic classifiers in an asset streaming session and provide classifier updates to solve the NAT problem. Although PCMM is used as an example admission control signaling interface between SRM 110 and CMTS 140, the methods described below may be used by any admission control protocol capable of supporting multiple classifiers per session.

At stage 340, content server 130 may transmit an update of the correct IP address and port of user terminal 160 to SRM 110. SRM 110 may update the classifier for the asset provision session and send the updated classifier to CMTS 140 at stage 350. A PCMM response confirming the update may be returned to SRM 110 at stage 355 and SRM 110 may confirm the update to content server 130 at stage 360. Content server 130 may then begin providing the requested asset at stage 370, as described above.

Figure 4:
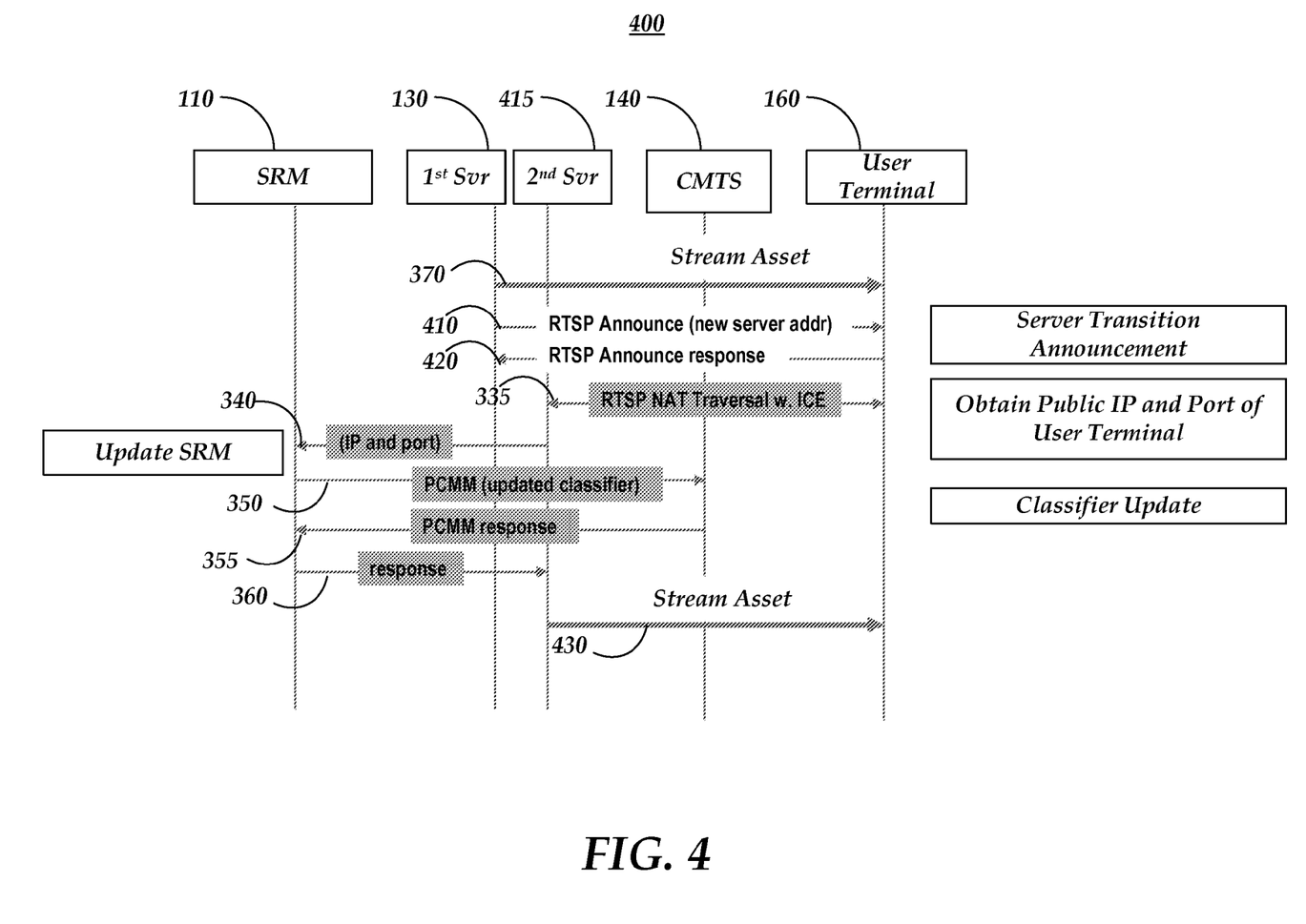
FIG. 4 is a timing diagram illustrating a method for mid-session admission control signaling.

FIG. 4 is a timing diagram 400 illustrating a method for mid-session admission control signaling. VoD servers may often introduce mid-session stream transitions for load balance or failover reasons. The mid-session transition may cause the STB public IP and port addresses to change with an address-and-port-dependent NAT device. This in turn may cause the session classifier to mismatch the asset stream. When content server 130 performs a mid-session transition, the admission control signaling and the data plane transition may not be synchronized.

For example, from stage 370 where an asset stream, such as a VoD stream, was being provided from content server 130 to user terminal 160, a server transmission announcement may be sent from content server 130 to user terminal 160 at stage 410. The announcement may comprise a control address and port for a second content server 415 operative to provide at least a portion of the asset stream. Consistent with embodiments of the invention, a mid-session transition may occur in response to changing to a different asset stream, such as by a user selection of another program and/or in preparation for the end of the asset stream and switching to a new asset stream. User terminal 160 may respond at stage 420, such as by acknowledging the server transmission announcement. Second content server 415 may then perform the NAT traversal of stage 335 and proceed through the stages of providing the asset stream to user terminal 160 as described above, culminating in streaming the portion of the asset stream and/or a new asset stream at stage 430.

Figure 5:
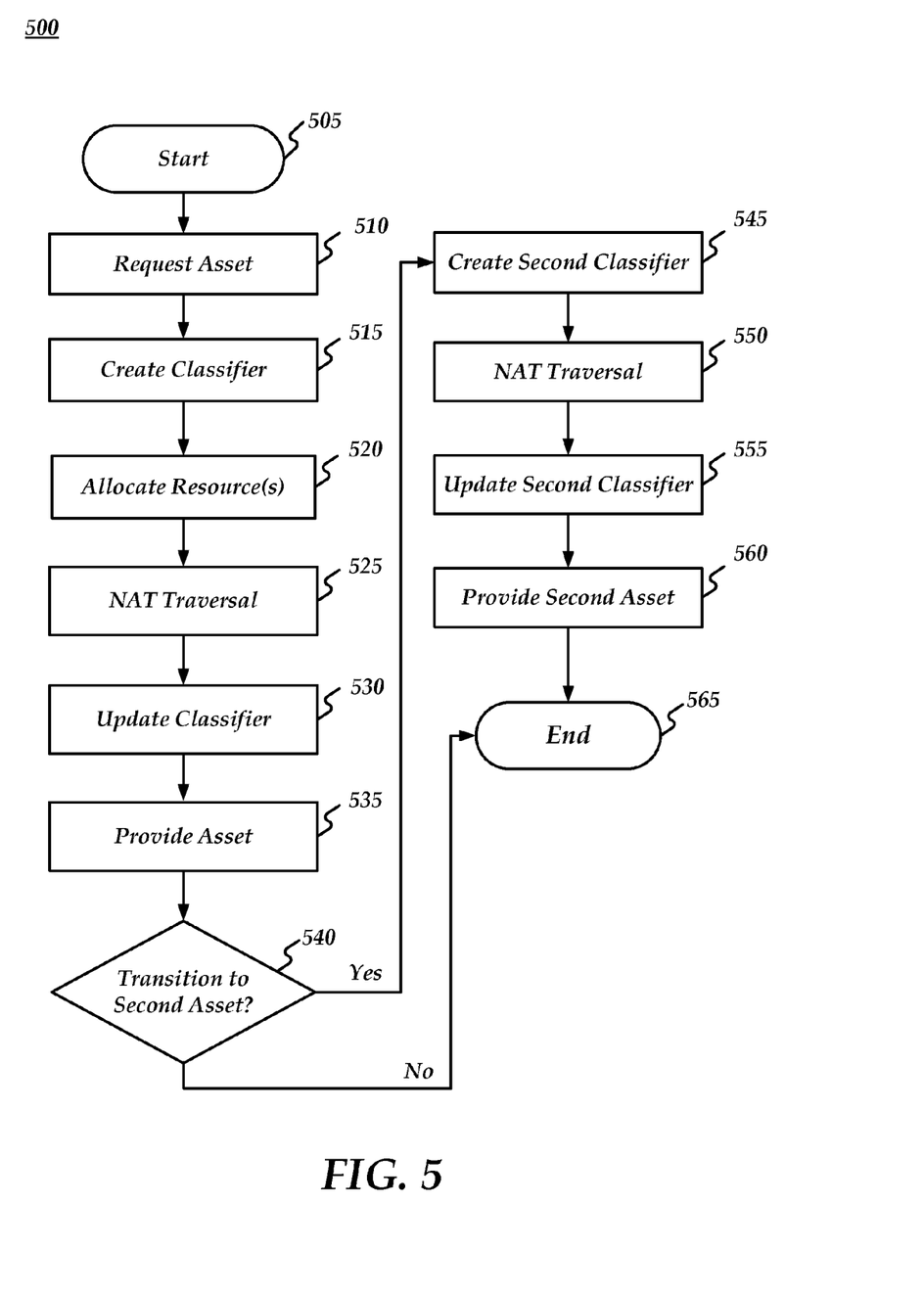
FIG. 5 is a flow chart illustrating a method for providing off-path admission control signaling.

FIG. 5 is a flow chart setting forth the general stages involved in a method 500 consistent with an embodiment of the invention for providing off-path admission control. Method 500 may be implemented using the components of CTS 100 as described above. Ways to implement the stages of method 500 will be described in greater detail below. Method 500 may begin at starting block 505 and proceed to stage 510 where user terminal 160 may request a content asset. For example, a user may order a Video on Demand asset through navigator 228. User terminal 160 may send a session control signal comprising content identifying data from BSPG database 218 to SRM 110. SRM 110 may find a public IP address associated with user terminal 160 by examining the IP layer address of the control signaling. For example, when a signaling protocol such as RTSP, Digital Storage Media Command and Control (DSMCC), and/or Session Initiation Protocol (SIP) is used, the TCP socket public IP address of user terminal 160 may be used as the public IP address. SRM 110 may also be operative to authenticate user terminal 160 for billing and/or administrative purposes, such as in conjunction with policy server 115.

From stage 510, where user terminal 160 requested the content asset, method 500 may advance to stage 515 where SRM 110 may construct a classifier for the session's admission control signaling. For example, the classifier may comprise a source address, a source port, a destination address, a destination port, and/or a protocol. The initial classifier may comprise at least one placeholder value chosen such that there is no mis-classification of traffic to this stream. For example, the placeholder value may comprise an arbitrary destination port, an arbitrary source port, an address associated with a creator of the classifier (e.g. SRM 110), a public address for user terminal 160, and/or a public address for the NAT device associated with user terminal 160.

In a VoD control plane, communication between SRM 110 and user terminal 160 may comprise a reliable transport protocol such as Transmission Control Protocol (TCP), while VoD streams associated with a data plane may be comprise a User Datagram Protocol (UDP). SRM 110 may not send UDP streams to the STB, thus, this classifier may comprise a placeholder that may not cause any traffic to be wrongly classified in the headend if UDP is chosen as the protocol type for the classifier. Arbitrary ports may be chosen for the source port and/or destination port, eliminating the need of choosing an unused UDP port in the system for the classifier.

Consistent with embodiments of the invention, the protocol type may be insufficient to differentiate communication between SRM 110 and user terminal 160 from data plane transmissions. Additional classifier information such as Differentiated Services (or "DiffServ") Code Point (DSCP) data may be used to build this initial classifier. DSCP data may comprise data in a field in the header of IP packets for packet classification purposes.

From stage 515, method 500 may advance to stage 520 where CTS 100 may allocate resources for providing the requested asset. For example, SRM 110 may send the placeholder classifier to CMTS 140, which may reserve bandwidth resources for the requested asset stream. If sufficient bandwidth is not available, CMTS 140 may so inform SRM 110 and CTS 100 may inform the requesting user that the requested asset is not currently available. The amount of bandwidth to be reserved may be known by SRM 110, may be provided as part of the request from user terminal 160, and/or may be requested and received from content server 130. Resource allocation and admission control may thus be completed with the place holder classifier during session setup time. This may simplify overall control plane signaling compared to performing admission control at play time and treat admission control failure as an error condition.

CTS 100 may also be operative to assign one of a plurality of content servers associated with providing the requested asset. For example, several VoD servers may store copies of the requested content. CTS 100 may select one of the servers according to a scheme such as round robin and/or assigning a server currently experiencing a low load (e.g. fewer active streaming sessions than others of the plurality of content servers).

From stage 520, where CTS 100 allocated the necessary resources, method 500 may advance to stage 525 where content server 130 may perform a NAT traversal procedure with user terminal 160 to obtain the correct IP and port pair of user terminal 160 for the requested asset. For example, content server 130 may communicate with the NAT device and user terminal 160 using the STUN and ICE mechanisms described above to determine the appropriate destination address and destination port to which the stream may be transmitted.

Method 500 may then advance to stage 530, where CTS 100 may update the classifier. For example, content server 130 may send an update to SRM 110 reflecting the determined destination address and port. SRM 110 may then update the classifier to the determined address and port along with the source address and port associated with content server 160. Consistent with embodiments of the invention, other fields of the classifier data structure may be updated, such as updating the protocol from UDP to TCP. The updated classifier may also be provided to CMTS 140 so that the asset stream from content server 130 may use the allocated resources in transmitting the requested asset to user terminal 160.

From stage 530, where CTS 100 updated the classifier, method 500 may advance to stage 535 where CTS 100 may provide the requested asset. For example, content server 130 may begin streaming the requested video on demand program to user terminal 160 through CMTS 140 and/or over network 150 using a streaming protocol such as RTSP for streaming control and UDP and/or RTP protocol for data encapsulation.

Once CTS 100 begins providing the asset in stage 535, method 500 may advance to stage 540 where CTS 100 may determine whether CTS 100 should transition to a second streaming server. For example, content server 130 may be completing the stream of the requested content and CTS 100 may need to transition to a subsequent content stream. For another example, a portion of the requested content may be stored on a different content server, such as second content server 415. Mid-session stream transitions may occur for load balance and/or failover reasons. The mid-session transition may cause the public IP and port address of user terminal 160 to change with an address-and-port-dependent NAT device. This in turn may cause the classifier to mismatch the real video stream. Furthermore, the admission control signaling and the data plane transition may not be synchronized.

If, at stage 540, CTS 100 determines that no transition is needed, method 500 may end at stage 565. Otherwise, method 500 may advance to stage 550 where CTS 100 may perform a second NAT traversal. For example, second content server 415 may perform a NAT traversal on user terminal 160 as described above. Method 500 may then advance to stage 555 where SRM 110 may create a second classifier with the discovered destination address and port of user terminal 160 and the source address and port of second content server 415.

From stage 555, method 500 may advance to stage 560 where second content server 415 may begin streaming to user terminal 160 as described above with respect to the first content server. Consistent with embodiments of the invention, the first classifier may be recycled once the second asset begins streaming. For example, SRM 110 may implement a timeout period for the old classifier and may update CMTS 140 to remove the old classifier after the stream transition. Since a NAT keepalive may comprise approximately 30 seconds and the stream transition may finish within a second, an example timeout period may comprise 30 seconds. For another example, the old classifier may be recycled by CMTS 140. CMTS 140 may receive the second data stream with the new classifier and may deactivate the old classifier immediately and/or after a short timeout period for the session. This example may avoid explicit signaling from SRM 110 to CMTS 140 to remove the obsolete classifier. Once CTS 100 transitions to providing the second asset in stage 560, method 500 may then end at stage 565.

Method 500 may be extended to a session with multiple flows, e.g. Real-time Transport Protocol (RTP) and RTP Control Protocol (RTCP) flows. Each flow may have multiple classifiers to support the mid session transition. The proposed method may not impose limitation on number of flows allowed per asset session.

An embodiment consistent with the invention may comprise a system for providing off-path admission control. The system may comprise one and/or more components comprising a memory storage and a processing unit coupled to the memory storage. The processing unit may be operative to receive a request for an asset from a client connected to a network via a network address translation device, create a classifier comprising at least one placeholder value, request bandwidth according to the placeholder classifier, identify an address and port pair for providing the asset to the client, and update the classifier with the identified address and port pair.

Another embodiment consistent with the invention may comprise a system for providing off-path admission control. The system may comprise one and/or more components comprising a memory storage and a processing unit coupled to the memory storage. The processing unit may be operative to request a first video on demand asset from a client associated with a network address translation device, create a control classifier comprising a plurality of data fields comprising at least one placeholder value, allocate resources for providing the first video on demand asset from a content provider according to the control classifier, perform a NAT traversal discovery of an address and a port of the client, update the control classifier according to the discovered address and port of the client, and provide the first video on demand asset to the client. The system may be further operative to determine whether to transition to a second video on demand asset, perform a second NAT traversal discovery of the address and the port of the client, create the second control classifier with the discovered address and the port of the client, and provide the second video on demand asset according to the second control classifier.

Yet another embodiment consistent with the invention may comprise a system for providing off-path admission control. The system may comprise a user terminal connected to a headend of a cable television system (CTS) operative to manage resources in the CTS. The system may further comprise a system resource manager connected to the user terminal and the headend operative to receive an asset request from the user terminal, create a placeholder classifier, and request bandwidth from the headend according to the placeholder classifier. The system may further comprise a content server comprising a memory populated with the at least one asset connected to the user terminal, the system resource manager, and the headend and operative to identify an address and port pair for providing the asset to the client and provide the identified client address and port pair to the system resource manager.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing off-path admission control, the method comprising:
receiving a request for a video on demand asset from a client device, wherein the client device is connected to a network using a network address translation (NAT) client;
identifying a content server for the requested asset;
creating a classifier for a flow of the requested asset, wherein creating the classifier comprises creating the classifier comprising a source address, a source port, a placeholder destination address, and a placeholder destination port;
sending the classifier for the flow to the identified content server; and
receiving an update for the classifier from the content server, wherein the content server, upon receiving the classifier for the flow, is configured to communicate with the NAT client to determine a private address and a private port assigned to the client device, and update the classifier by replacing the placeholder destination address and the placeholder destination port by private address and the private port assigned to the client device.

2. The method of claim 1, wherein creating the classifier further comprises creating the classifier further comprising a protocol type for the flow.

3. The method of claim 1, wherein the placeholder destination port comprises an arbitrary destination port.

4. The method of claim 1, wherein the placeholder destination address comprises a public IP address for the client associated with the network.

5. The method of claim 1, wherein the classifier is created by a session resource manager.

6. The method of claim 1, selecting the content server further comprises selecting one of a plurality of video on demand servers to provide the requested asset to the client.

7. The method of claim 1, wherein creating the classifier comprises:
setting the source address of the classifier to an address of the identified content server;
setting the source port of the classifier to a port of the identified content server from which the requested asset is to be provided;
setting the placeholder destination address of the classifier to a public address of the client device; and
setting the placeholder destination port of the classifier to the identified destination port associated with the client device.

8. The method of claim 1, further comprising:
requesting a bandwidth for the flow, wherein requesting the bandwidth comprises requesting the bandwidth based on the updated classifier.

9. The method of claim 1, wherein receiving a request for the video on demand asset comprises receiving the request on a session resource manager of a cable system.

10. The method of claim 5, further comprising requesting a bandwidth for the flow, wherein requesting the bandwidth comprises the session resource manager providing the classifier to a cable modem termination system operative to:
determine whether sufficient bandwidth is available to provide the requested asset to the client; and
in response to determining that sufficient bandwidth is available to provide the requested asset to the client, reserving the bandwidth.

11. A method for providing off-path admission control signaling, the method comprising:
receiving a request for a video on demand asset, the request comprising a first classifier comprising a source address, a source port, a placeholder destination address, and a placeholder destination port;

performing a network address translation (NAT) traversal discovery, wherein performing the NAT traversal discovery comprises determining private address and a private port assigned to a client device associated with the received request;

updating the first classifier, wherein updating the classifier comprises replacing the placeholder destination address and the placeholder destination port with the discovered private address and the private port of the client device;

providing the video on demand asset to the client device according to the first classifier;

determining whether to transition to a second content server for the video on demand asset;

in response to determining to transition to the second content server, performing a second NAT traversal discovery of the address and the port of the client;

creating a second session admission control signaling classifier with the discovered address and the port of the client; and providing the video on demand asset according to the second session admission control signaling classifier.

12. The method of claim 11, wherein the first classifier further comprise a protocol type.

13. The method of claim 11, wherein the placeholder destination address comprises an address of a session resource manager operative to create the first session admission control signaling classifier.

14. The method of claim 11, wherein receiving the request comprising the first classifier comprises receiving the request wherein the first classifier comprises setting at least one data field to a value not matching existing traffic.

15. The method of claim 11, wherein determining whether to transition to the second content server comprises determining whether to transition to at least one of the following: a second portion of the video on demand asset and a different video on demand asset.

16. The method of claim 11, wherein the first classifier is recycled after beginning to provide the second video on demand asset according to the second session admission control signaling classifier.

17. The method of claim 11, wherein the video on demand asset is provided by a first video on demand server according to the first classifier and the video on demand asset is provided by a second video on demand server according to the second classifier.

18. The method of claim 17, wherein the second video on demand server is operative to determine whether the client is associated with at least one of a new address and a new port.

19. A system for providing off-path admission control signaling, the system comprising:

a user terminal connected to a network communications device, wherein the network communications device comprises a private address assigned via a network address translation (NAT) mechanism;

a headend operative to manage resources in an asset provision network;

a system resource manager communicatively connected to the user terminal and the headend via the asset provision network operative to:
receive an asset request from the user terminal,
identify a content server for providing the requested asset,
create a classifier for a flow for providing the requested asset, wherein the classifier comprises a source address as address of the identified content server and a placeholder value for a destination address,
request a bandwidth for the flow from the headend according to the classifier, and
send the request to the identified content server to provide the requested asset to the user terminal based on the classifier; and wherein the content server comprises a memory populated with at least one asset, and is operative to:
communicate, upon the receipt of the request to provide the requested asset, with the user terminal to identify the private address assigned to the user terminal via the NAT mechanism,
update the classifier to replace the placeholder value for the destination address with the identified private address assigned to the user terminal,
create the flow based on the updated classifier to provide the request asset, and
provide the updated classifier to the system resource manager.

20. The system of claim 19, wherein the system resource manager is further configured to send the updated classifier to the headend to reserve a bandwidth for the flow.

* * * * *